United States Patent
Iwata et al.

(10) Patent No.: US 6,798,839 B2
(45) Date of Patent: Sep. 28, 2004

(54) IMAGE PROCESSING DEVICE, TELEVISION RECEIVER AND IMAGE REPRODUCING DEVICE

(75) Inventors: Haruya Iwata, Kawasaki (JP); Naoyuki Kai, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 500 days.

(21) Appl. No.: 10/011,392

(22) Filed: Dec. 11, 2001

(65) Prior Publication Data

US 2002/0071056 A1 Jun. 13, 2002

(30) Foreign Application Priority Data

Dec. 12, 2000 (JP) ........................................ 2000-377839

(51) Int. Cl.$^7$ ........................... H04N 7/12; H04N 11/04; H04N 11/02
(52) U.S. Cl. .................. 375/240.28; 345/500; 345/510; 345/521; 386/12; 386/65
(58) Field of Search ...................... 375/240.28; 348/500, 348/510, 521, 522, 523, 423.1; 386/12, 65

(56) References Cited

FOREIGN PATENT DOCUMENTS

| JP | 8-116532 | 5/1996 |
| JP | 11-225332 | 8/1999 |

*Primary Examiner*—Gims Philippe
*Assistant Examiner*—Charles Parsons
(74) *Attorney, Agent, or Firm*—Oblon, Spivak, McClelland, Maier & Neustadt, P.C.

(57) ABSTRACT

Coded image data having a DTS (decode time stamp) appended for each frame are written into an input buffer. A portion of the storage area of the input buffer is scanned to produce identification information (ID) for each frame of image data. For each frame of image data, the ID, DTS, storage location in the buffer and coding type are held in the form of a mapping table. The system time clock (STC) is compared with the DTSs in the table. When a match occurs, the storage location for the corresponding frame of image data is read from the table and sent to a decoder, which in turn reads the corresponding image data from the buffer and decodes it.

15 Claims, 7 Drawing Sheets

IMAGE PROCESSING DEVICE, TELEVISION RECEIVER AND IMAGE REPRODUCING DEVICE

CROSS-REFERENCE TO RELATED APPLICATIONS

This application is based upon and claims the benefit of the priority from the prior Japanese Application No. 2000-377839, filed Dec. 12, 2000, the entire contents of which are incorporated herein by reference.

BACKGROUND OF THE INVENTION

1. Field of the Invention

The present invention relates to an image processing device for decoding digitally coded image data, and a television receiver and an image (picture) reproducing device which use the image processing device. More specifically, the present invention relates to a device for decoding image data, such as MPEG-based data, to which the decode time stamps are appended.

2. Description of the Related Art

A technique which uses the decode time stamp in decoding coded data, such as MPEG data, is disclosed in, for example, Jpn. Pat. Appln. KOKAI Publication No. 8-116532. This technique is intended to facilitate the decode operation control by writing the decode time stamp (hereinafter referred to as DTS) into a buffer together with coded image data and utilizing the DTS read from the buffer in starting frame-by-frame decoding.

That is, before starting decoding, the DTS appended to the beginning of a frame is compared with the count in a system time clock (STC) counter in the decoding device. When a match occurs, the corresponding image data is read from the buffer and then decoded.

However, errors may occur in coded data input to the decoding device when they are received through broadcasting or played back from a recording medium. In such case, the decoding device may fail to perform the decoding operation properly or the start of decoding may be delayed.

Once the start of decoding is delayed, the restoration to the proper decoding operation becomes difficult because the DTS and the counter in the STC counter do not match. The delay of the start of decoding may cause the buffer to overflow.

In Jpn. Pat. Appln. KOKAI Publication No. 11-225332 is disclosed a technique which involves attaching identification information (hereinafter referred to as ID) to each frame of image data, creating a table in which IDs are mapped to DTSs, image data storage locations in the buffer, and coding types, and managing the image data decoding operation using that table. According to this technique, the STC is produced based on the program clock reference value (hereinafter referred to as PCR) and the resulting STC is compared with the DTS to determine the ID of a frame to be decoded. A frame of image data the ID of which corresponds to the DTS that matches the STC is read from the buffer and then decoded.

The image decoding method and the decoding device disclosed in the above Patent Publication will described below with reference to FIGS. 1, 2, and 3.

Figure 1:
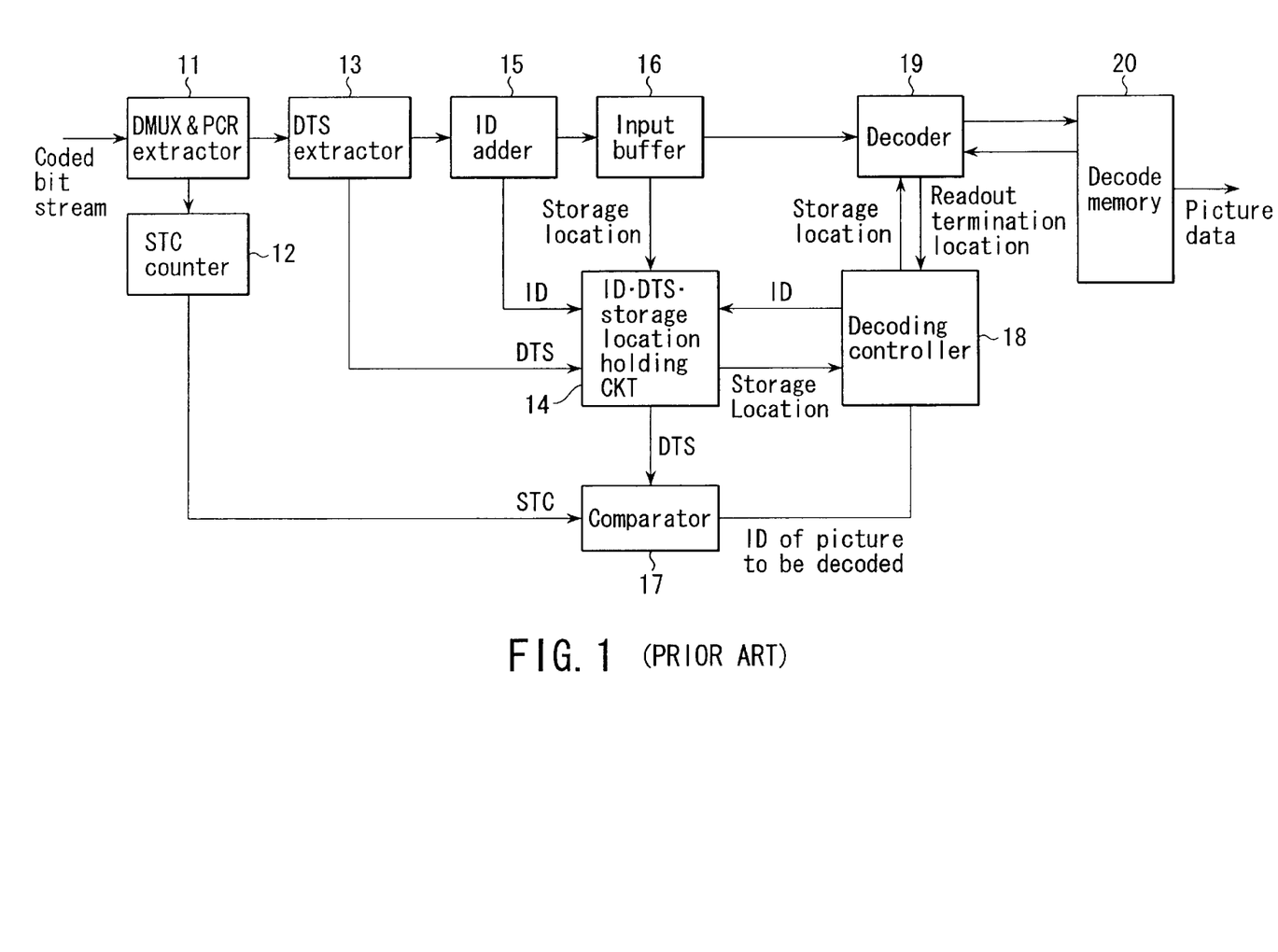
FIG. 1 is a block diagram of a conventional picture data decoding device.

FIG. 1 is a block diagram of the image data decoding device for decoding coded image data (for example, MPEG-2 transport stream) using PCR and DTS.

A coded bit stream with temporal information, such as an MPEG-2 transport stream (TS), is input to a demultiplexer (DMUX)/PCR extractor (hereinafter abbreviated as the PCR extractor) 11, where the PCR value required to produce the reference time (STC) is extracted from the bit stream. The extracted PCR is sent to an STC counter 12, where a comparison is made between the STC (count) and the PCR. When there is a difference between them, the STC is reset to the PCR; namely, the STC is revised to the reference time on the encoder side.

Also, in the PCR extractor 11 a coded bit stream with DTSs, such as an MPEG-2 packetized elementary stream (hereinafter referred to as PES), is separated from the input data and then sent to a DTS extractor 13. The DTS is extracted in the DTS extractor 13 and then applied to an ID/DTS/storage location holding circuit 14.

The data input to the DTS extractor 13 is sent to an ID adder 15, where the header information of each frame of image data is detected and identification information (ID) is produced for each frame on the basis of its header information. A picture type (coding type for the corresponding frame) is sent from the ID adder 15 to the ID/DTS/storage location holding circuit 14 together with the corresponding ID.

The data input to the ID adder 15 are written into an input buffer 16 in sequence. The storage location information (an address in the buffer) for each data written into the input buffer 16 is presented from the input buffer 16 to the ID/DTS/storage location holding circuit 14.

Here, the data input to the ID adder 15 may be a coded bit stream with temporal information, such as PES. However, since the temporal information needs to be removed in a decoder to be described, it is desirable that the input data be coded image data without temporal information (i.e., elementary stream: ES).

In the ID/DTS/storage location holding circuit 14 is created and stored a table in which the DTS extracted from each frame of input data by the DTS extractor 13, the storage location in the buffer 16 in which the corresponding input data has been stored, and the ID produced for the corresponding input data in the ID adder 15 are mapped (ID/DTS/storage location mapping table).

In a comparator 17, the STC from the STC counter 12 is compared with DTSs in the table in the ID/DTS/storage location holding circuit 14 to determine the presence or absence of a frame for which decoding is to begin. In the presence of such a frame, its ID is sent to a decoding controller 18.

The storage location information corresponding to the ID from the comparator 17 is read from the ID/DTS/storage location holding circuit 14 into the decoding controller 18, which in turn provides the storage location and decoding area of data to be decoded and an instruction to start decoding to the decoder 19. The decoder can decode any rectangular image area.

The decoding controller 18 makes reference to the state of the decoder 19 to determine a reproduction mode, such as normal, skip, or repeat. The normal reproduction mode is one in which each frame of image data is reproduced in succession. The skip reproduction mode is one in which frames are reproduced with some of them skipped. The repeat reproduction mode is one in which the same frame is reproduced repeatedly. In the decoder 19, data read from the specified storage location in the buffer is decoded.

In MPEG-2, there are three image compression schemes. The first scheme utilizes spatial correlation for coding (compression). In a natural image, since the values of neighboring pixels are close to each other (interpixel correlation is high), the spatial correlation in the image is utilized for coding (compression). The second scheme utilizes interframe (temporal) correlation in an image sequence. In this scheme, compression is performed by storing image information from the previous frame and representing the current frame by the difference from the previous frame. The third scheme utilizes nonuniform probabilities of occurrence of symbols in coding (compression) by the first and second schemes.

Of image data decoded by the decoder 19, frame data coded utilizing spatial correlation are written into a decode memory 20 as they are. As for frame data coded utilizing temporal correlation, data in the process of being decoded is processed using previously decoded image data from the decode memory 20 and the resultant decoded data is written into the decode memory. After decoded data have been written into the decode memory 20, the decoder 19 notifies the decoding controller 18 of the termination of decoding and the location at which readout was terminated.

To decode multi-channel image data, the same table as described previously is created for each channel in the ID/DTS/storage location holding circuit 14. In this case, using the readout termination location information from the decoder 19 the decoding controller 18 allows the decoder to decode image data on different channels on a time-sharing basis. Decoded image data for each frame is sent to a display processor.

The operation of the image data decoding device shown in FIG. 1 will be explained using a table of FIG. 2 created by the ID/DTS/storage location holding circuit 14. Each frame of image data input to the DTS extractor 13 contains a DTS. The ID adder 15 detects the frame header, then identifies the picture type (hereinafter abbreviated as PT) and creates a frame ID.

MPEG-1 and MPEG-2 provide bidirectional prediction using two frame memories; forward prediction from a past reconstructed image and backward prediction from a future reconstructed image. To implement such bidirectional prediction, MPEG-2 defines three picture types: I-picture (intra-picture), P-picture (predictive picture), and B-picture (bidirectionally predictive picture).

Figure 2:
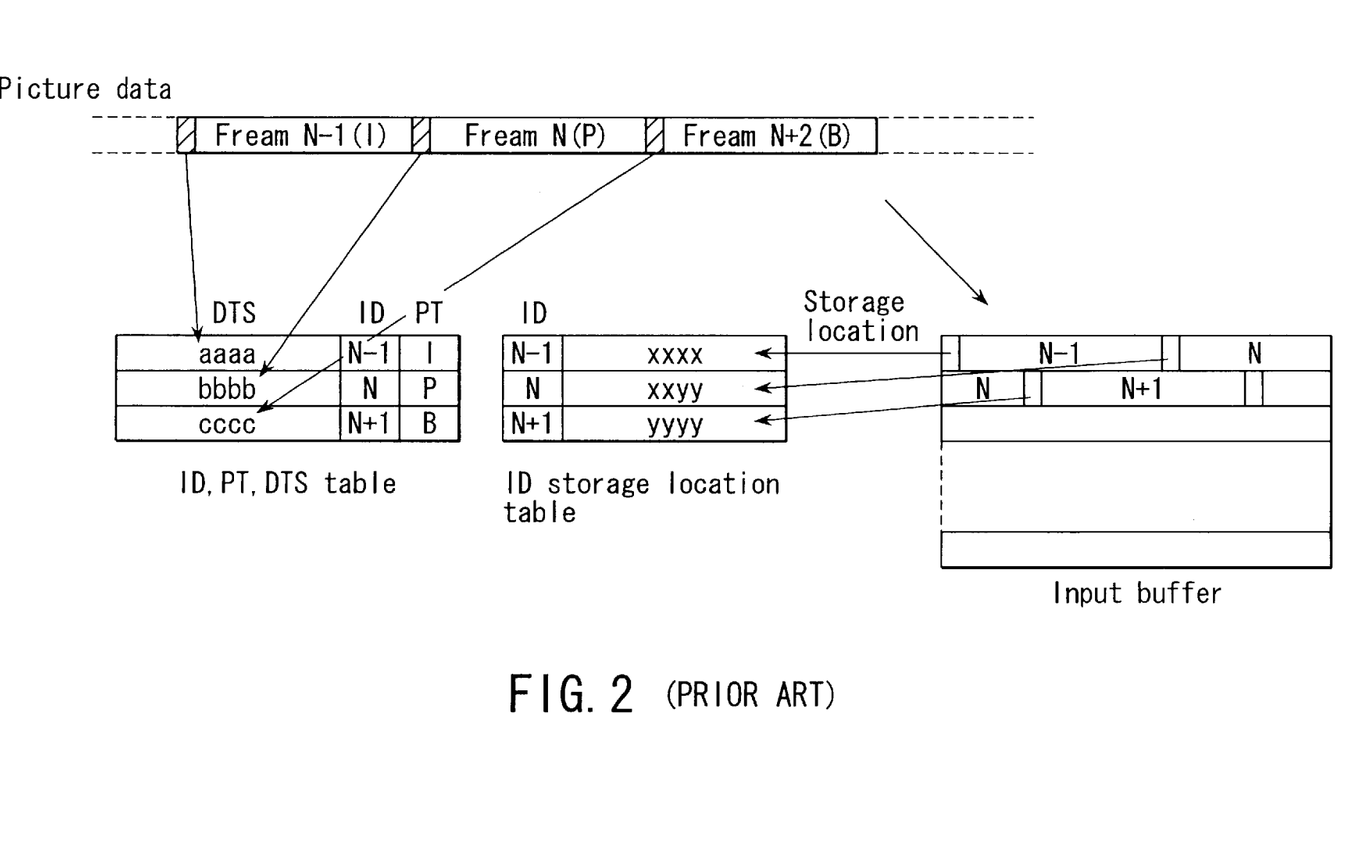
FIG. 2 shows a table used in the conventional device and the present invention.

In FIG. 2, frame IDs are taken as N−1, N, and N+1 and PTs as I, P, and B. Image data have been written closely into the input buffer 16 in the order of frame N−1, frame N, and frame N+1. Each shaded portion in the image data indicates the header of the corresponding frame. In the ID/DTS/storage location holding circuit 14, a table is created and stored in which the ID, PT, DTS and header storage location are mapped for each frame.

In the comparator 17, the DTSs in the table are compared with STC to identify the ID of frame data to be decoded. Upon receipt of that ID, the decoding controller 18 identifies the storage location of that frame in the input buffer 16 and then instructs the decoder 19 to start decoding of the frame data in that storage location. The time at which the decoding controller 18 instructs the decoder to start decoding may be synchronous with a decode sync signal of a fixed period applied to the controller. Alternatively, the controller 18 may instruct the decoder 19 as soon as it receives ID information from the comparator 17, in which case the comparator 17 is configured to make comparison with DTSs and STC in synchronism with that decode sync signal.

An example of a decode operation will be explained by reference to FIG. 3. In addition, why the above table is needed will be described.

Figure 3:
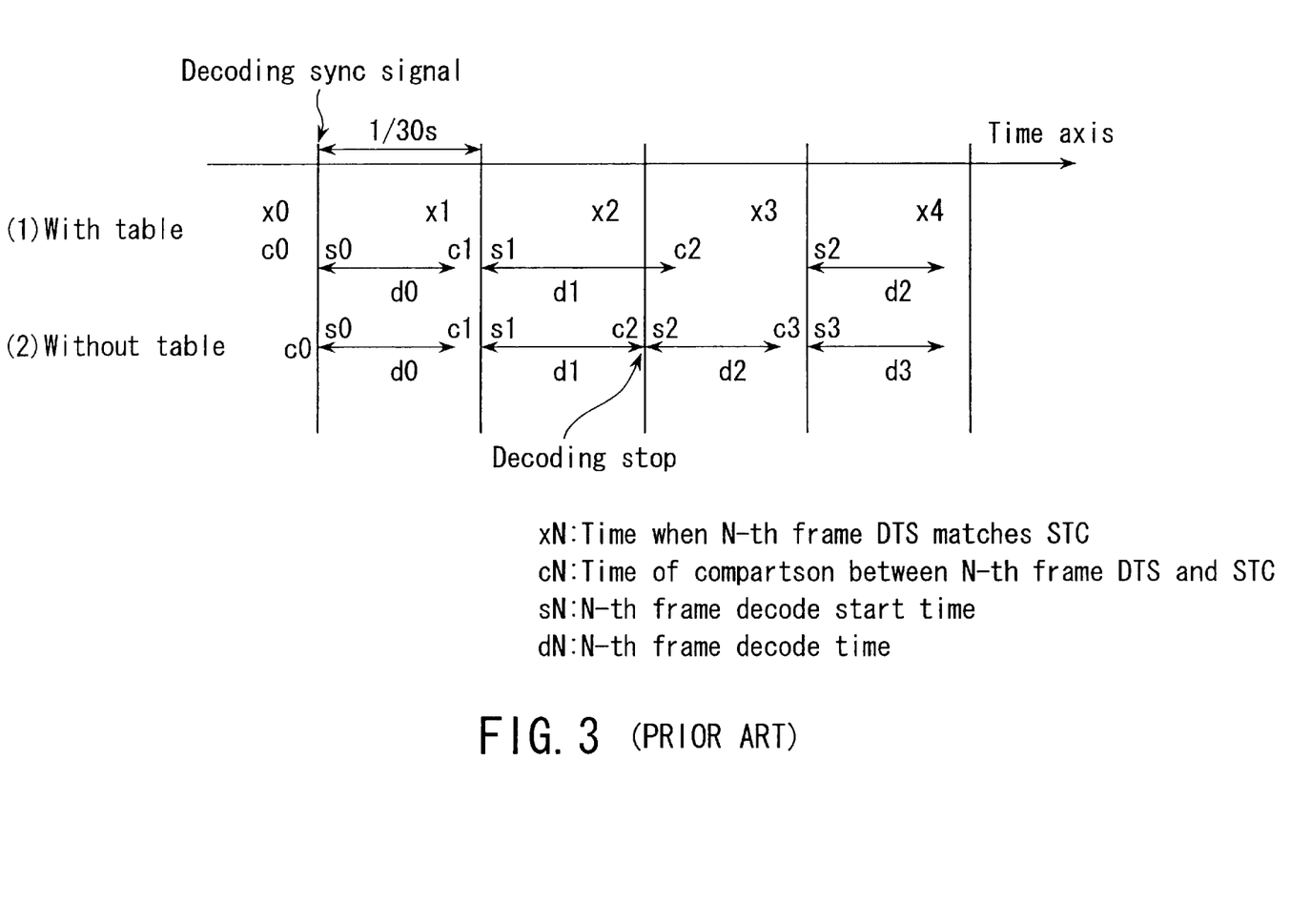
FIG. 3 is a diagram for use in explanation of the decoding operation of the conventional decoding device.

FIG. 3 illustrates (1) a decode operation without the table (Jpn. Pat. Appln. KOKAI Publication No. 8-116532) and (2) a decode operation with the table (Jpn. Pat. Appln. KOKAI Publication No. 11-225332).

In FIG. 3, the horizontal axis represents time. The time axis is equally divided into sections and one section is assumed here to be one-thirtieth seconds. Each interval indicated by a line with arrows is one when frame data is being decoded.

FIG. 3 shows a situation in which the decoding d0 of the 0-th frame is terminated as scheduled, but the termination of decoding d1 of the first frame is delayed for some cause.

In the decoding operation (1) of FIG. 3, since there is no table, the DTS that can be compared with the STC is the one associated with a frame to be decoded next. Thus, in the event of delayed termination of decoding of the first frame, the comparison between STC and DTS is delayed correspondingly with the result that the decoding of the second frame is delayed.

In the decoding operation (2) of FIG. 3, since there is a table, the STC can be compared with the DTSs in the table at regular intervals in synchronism with the decoding sync signal. Therefore, even if the termination of decoding of the first frame is delayed, the decoding of the first frame can be stopped at the time when decoding of the second frame is to begin, allowing the decoding of the second frame to be started immediately.

In the MPEG-based coding, use is made of three coding schemes: I-frame (corresponding to the I-picture) coding in which coding is performed on individual frames and a picture is reconstructed using only data from a single frame, P-frame (corresponding to the P-picture) coding in which use is made of predictive coding based on a past picture, and B-frame (corresponding to the B-picture) coding in which predictive coding is performed using both past and future frames. Since a P-frame is coded using prediction from one past I- or P-picture, the current P-frame has to be decoded using the past predicted picture. The decoding of a B-frame requires two past I- or P-pictures because two past and future I- or P-pictures are used in the prediction of it.

If the first frame is an I- or P-picture, stopping decoding of it will disable subsequent P- or B-frames from being displayed as pictures. Thus, if a picture is an I- or P-picture, the decoding of it is continued without being stopped as in the operation (1) shown in FIG. 3. When the second frame is a B-picture which is not used in decoding other pictures, the decoding of it is stopped so that decoding of the third frame is started.

Thus, by restricting pictures the decoding of which is to be stopped to B-frames, the effect of stopping the decoding process on display can be minimized. When DTSs are not appended to all frames, DTSs of frames with no DTS can be produced by adding the decoding time for 1 or 1.5 frames to the DTSs appended to frames. The resultant DTSs are entered into a management table. Only pictures with no DTSs can also be managed using a table. Special reproduction of pictures can also be realized through the use of a table.

The concurrent processing of multi-channel bit streams can be facilitated by creating a table for each channel. The provision of a table for each channel will accommodate a system having less decoders than there are channels to be processed. Thus, the provision of a table is very useful.

However, in the prior art a table is created for all the data that are written into the input buffer 16. The table thus must have the size corresponding to a maximum number of frames that can be written into the input buffer 16. As a result, the table size increases and the memory capacity required of the ID/DTS/storage location holding circuit 14 increases. The special reproduction of pictures, particularly reproduction in reverse direction, requires a very large amount of memory; that is, the input buffer is required to have a very large storage capacity.

BRIEF SUMMARY OF THE INVENTION

According to an aspect of the present invention, there is provided an image processing device comprises: a reference time information extractor coupled to receive a bit stream containing coded image data and having system reference time information for reproducing the system reference time on an encoder side and decode start time information appended for extracting the system reference time information; a buffer coupled to receive the bit stream after the system reference time information has been extracted for storing it; a decoding controller coupled to the buffer for scanning a portion of the bit stream stored in the buffer to produce identification information for each frame of image data and then outputting the identification information together with decode start time information for the corresponding frame of image data, information concerning the storage location of the corresponding frame of image data in the buffer, and information concerning a coding type of the corresponding frame of image data; a hold circuit coupled to the decoding controller for holding the identification information, the decode start time information, the storage location information, and the coding type information for each frame of image data in the form of a mapping table; a reference time information revise circuit coupled to the reference time information extractor for producing reference time information on a decoder side and, in the even that there is a displacement between the decoder-side reference time information and the system reference time information, revising the decoder-side reference time information; a comparator coupled to the reference time information revise circuit and the hold circuit for making a comparison between the decoder-side reference time information and the decode start time information for each frame in the hold circuit and, when a match occurs, outputting the identification information for image data to be decoded; and a decoder coupled to the buffer and the decoding controller for reading that image data to be decoded from the buffer and decoding it, the decoding controller reading from the hold circuit the storage location information for the image data corresponding to the identification information output from the comparator and sending it to the decoder as an address used in reading the image data from the buffer.

According to another aspect of the present invention, there is provided an image processing method comprises: receiving a bit stream containing coded image data and having system reference time information for reproducing the system reference time on an encoder side and decode start time information appended and extracting the system reference time information from the bit stream; producing reference time information on a decoder side and, in the even that there is a displacement between the decoder-side reference time information and the system reference time information, revising the decoder-side reference time information; storing the bit stream after the system reference time information has been extracted into a buffer; scanning a portion of the bit stream stored in the buffer to produce identification information for each frame of image data and then holding, in the form of a mapping table, the identification information, decode start time information for the corresponding frame of image data, information concerning the storage location of the corresponding frame of image data in the buffer, and information concerning a coding type of the corresponding frame of image data; making a comparison between the decoder-side reference time information and the decode start time information for each frame in the table and, when a match occurs, outputting the identification information for image data to be decoded, and reading the storage location information for the image data corresponding to the identification information from the table and sending it to the decoder as an address used in reading and decoding the image data from the buffer.

DETAILED DESCRIPTION OF THE INVENTION

Figure 4:
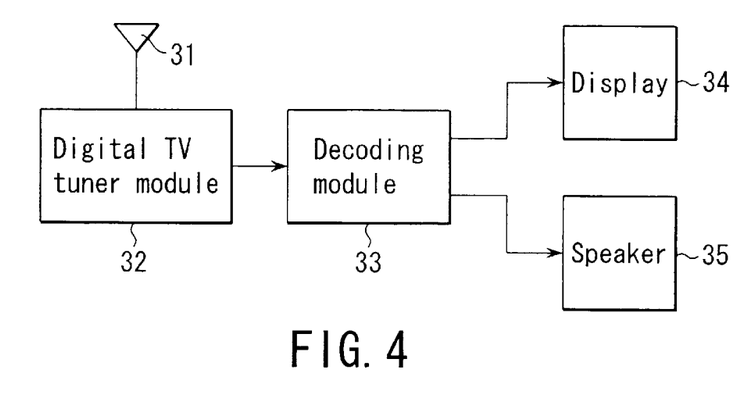
FIG. 4 is a simplified block diagram of a digital television receiver according to a first embodiment of the present invention.

Referring now to FIG. 4, there is illustrated, in simplified block diagram form, the overall configuration of a digital television receiver according to a first embodiment of the present invention. An analog-modulated digital television broadcast signal received by an antenna 31 is sent to a digital television tuner module 32. In the tuner module 32, a desired station is selected and the resultant analog signal is converted into digital form. Finally, a coded bit stream with temporal information, such as an MPEG-2 transport stream, is produced. This bit stream is then fed into a decoding module 33 where it is decoded into a video signal and an audio signal. The video signal is input to a display unit 34, so that pictures are visually displayed. The audio signal is applied to a loudspeaker 33.

Figure 5:
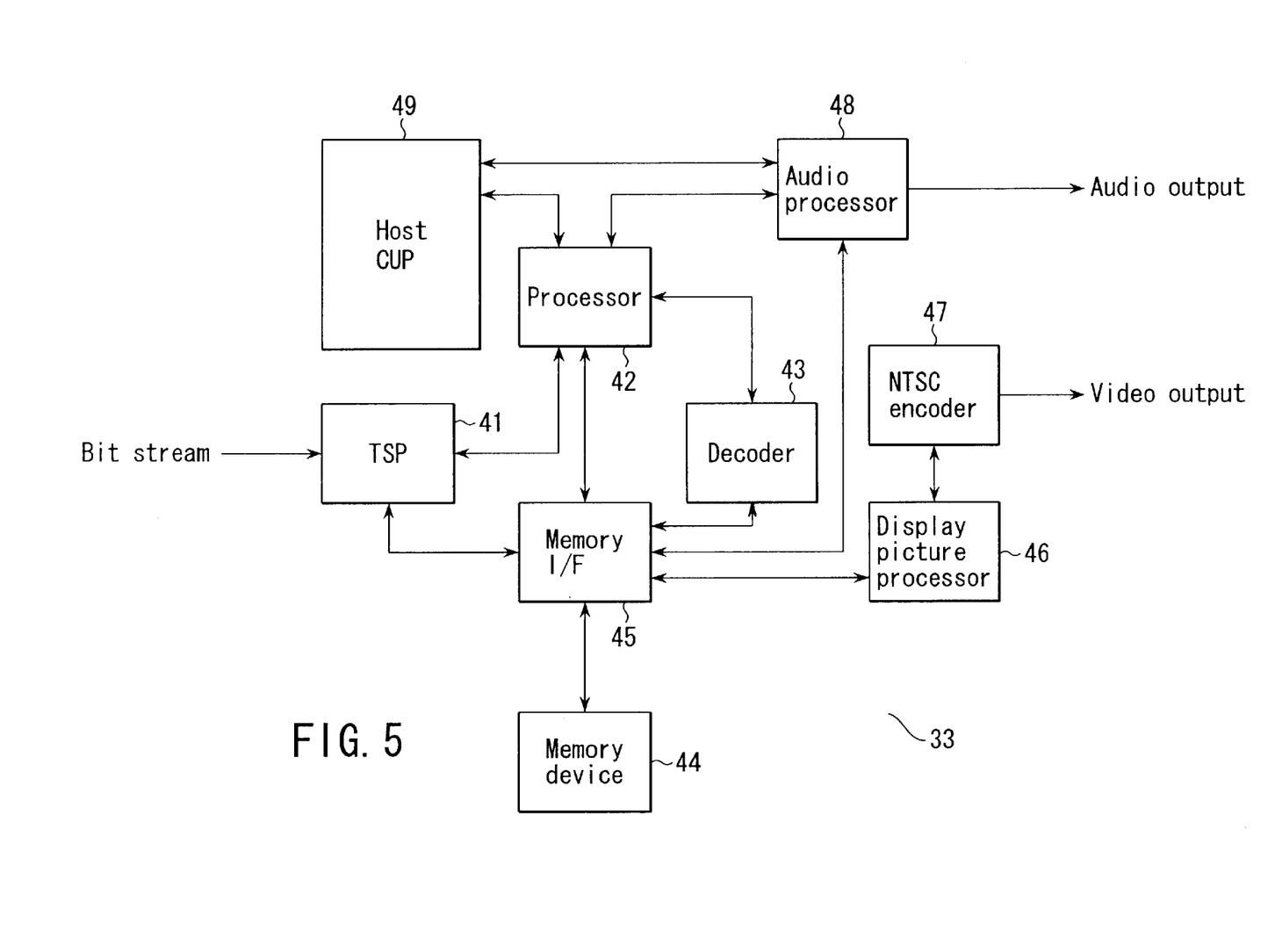
FIG. 5 is a block diagram of the decoding module in FIG. 4.

FIG. 5 shows the detailed arrangement of the decoding module 33 in FIG. 4. The module, which is adapted to decode the input coded bit stream to produce a video signal and an audio signal as described above, includes a transport stream processor (TSP) 41, a processor 42, a decoder 43, a memory device 44, a memory interface (memory I/F) 45, a display picture processing circuit 46, an NTSC encoder 47, an audio processing circuit 48, and a host CPU 49 which controls the operation of the entire device.

Figure 6:
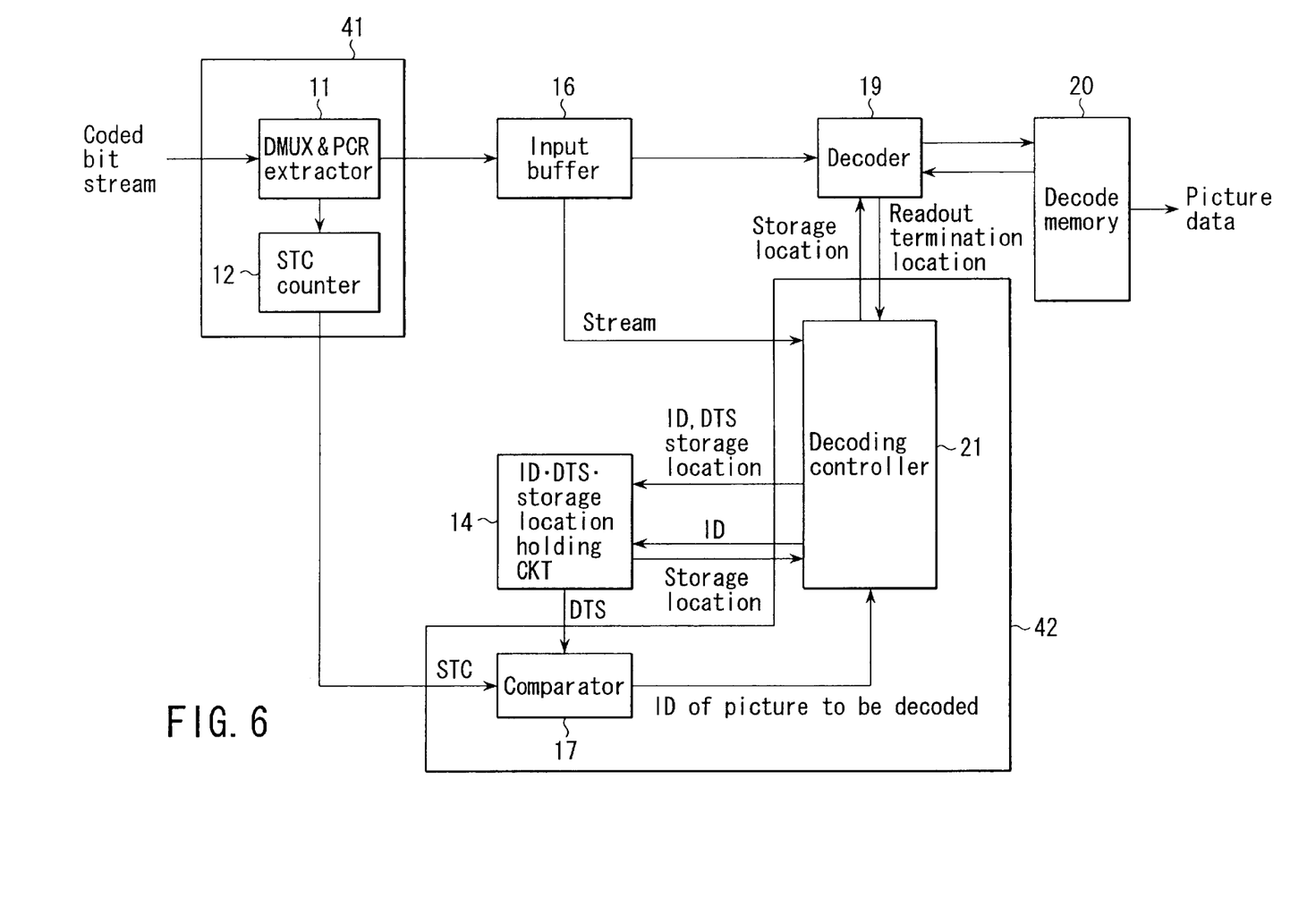
FIG. 6 is a more detailed block diagram of part of the decoding module in FIG. 5.

FIG. 6 shows the detailed arrangement of part of the docoding module 33 shown in FIG. 5. In FIG. 6, like reference numerals are used to denote corresponding components to those in the prior art of FIG. 1.

In FIG. 6, a coded bit stream, such an MPEG-2 transport stream (TS), is input to the PCR extractor (DMUX/PCR extractor) 11 where the PCR for producing the reference time (STC) is extracted from the bit stream. The extracted PCR is sent to the STC counter 12 where a comparison is made between the PCR and STC. When they are displaced relative to each other, the STC is reset to the PCR. That is, the STC is revised to the reference time on the encoder side. The PCR extractor 11 and the STC counter 12 correspond to the TSP 41 in FIG. 5.

Also, in the PCR extractor 11, coded bit streams each with a DTS, such as MPEG-2 packetized elementary streams (PESs), are separated from the input data and then written into the input buffer 16 in sequence. The input buffer 16 forms part of the memory device 44 in FIG. 5.

A decoding controller 21 scans through part of undecoded data stored in the input buffer 16 for the purpose of decoding PES header information to extract a DTS for each frame and detecting header information to produce an ID for each frame. In scanning through the input buffer, the bit stream is read out in a nondestructive manner. Furthermore, the decoding controller 21 extracts picture types (PT) and identifies the storage location of data at the beginning of each frame. The ID, DTS, PT and storage location are made to correspond with one another for each frame and then sent to the ID/DTS/storage location holding circuit 14, which stores the ID, DTS, PT and storage location corresponding to a predetermined number of frames in the form of a mapping table. The ID/DTS/storage location holding circuit 14 forms part of the memory device 44.

The comparator 17 references the mapping table in the ID/DTS/storage location holding circuit 14 for comparison between the STC and the DTSs and determines the presence or absence of a frame in which decoding is to begin. In the presence of such a frame, its ID is sent to the decoding controller 21. The decoding controller 21 reads the storage location information corresponding to the ID sent from the comparator 17 from the ID/DTS/storage location holding circuit 14 and presents the storage location information for frame data to be decoded, a decoding area, and a decode start command to the decoder 19. The decoder 19 is allowed to decode any rectangular area of a picture. The decoder 19 corresponds to the decoder 43 in FIG. 5. The comparator 17 and the decoding controller 21 correspond to the processor 42 in FIG. 5.

The decoding controller 21 references the decoding state of the decoder 19 and judges which of the normal, skip and repeat modes a picture is reproduced in.

Data are read out from the area in the input buffer 16 which is specified by the storage location (address) information and then decoded in the decoder 19. The header information of the data read from the input buffer 16 is removed in the decoder 19. For frame data coded using spatial correlation, decoded picture data is written into the decode memory 20 as it is. For frame data coded using temporal correlation, picture data being currently decoded is processed (decoded) using already decoded picture data read from the decode memory and the resulting decoded picture data is written into the decode memory 20. The decoder 19 sends decode termination and read termination location to the decoding controller 21. These control operations are performed using the previously described PT. The decode memory 20 forms part of the memory device 44 in FIG. 5.

Each frame data thus decoded is sent through the memory I/F 45 in FIG. 5 to the display picture processor 46, which performs such a process as adds another picture to a selected area of a picture. The output of the display picture processing circuit 44 is sent to the NTSC encoder 47 (which is merely exemplary) where picture data is converted into a video signal in a predetermined television format. The resultant video signal is then sent to the display 34 in FIG. 4 to display a picture.

As for audio data, it is also stored in the memory device 44 in FIG. 5. The audio data is sent from the memory device 44 through the memory I/F 45 to the audio processor 48 where it is converted into analog form. The resultant analog audio signal is then delivered to the loudspeaker 35 in FIG. 4.

To decode multi-channel image data, such a table as described previously is created for each channel in the ID/DTS/storage location holding circuit 14. In this case, the decoding controller 21 allows the decoder 19 to process different channels on a timesharing basis through the use of readout termination location information from it.

Thus, in the digital television receiver described above, coded bit streams with DTSs separated in the PCR extractor 11 are directly written into the input buffer 16. The bit streams in the input buffer are scanned in part by the decoding controller 21 to extract DTSs and PTs and an ID is created for each frame. The storage location of data at the beginning of each frame is identified. The resultant IDs, DTSs, storage locations and PTs are stored in the ID/DTS/storage location holding circuit 14 in the form of a table.

In this manner, the table is created for part of the bit streams written into the input buffer 16. Thus, the table is simply created for a predetermined number of frames less than a maximum number of frames written into the input buffer, allowing the table size to be made smaller than in the prior art. This results in a reduction in the memory capacity of the ID/DTS/storage location holding circuit 14, i.e., that storage area in the memory device 44 in FIG. 5 which is used for storing the table.

In addition, the DTS extractor 13 and the ID adder 15 in the prior art become unnecessary. The bit streams in the input buffer 16 are scanned by the decoding controller 21 to produce or extract information, such as IDs, DTSs, etc. This increases the margin for producing or extracting information, such as IDs, DTSs, etc. It therefore becomes unnecessary to add hardware for increasing the processing speed to the processor 42 in FIG. 5 which forms the decoding controller 21, allowing not only the processor 42 itself but also the entire device to be prevented from increasing in circuit scale.

In the first embodiment, the decoding controller 21 creates a table corresponding in size to a required number of frames. This table creation processing must be performed prior to the decode processing by the decoder 19. Depending on the required number of frames, it is desirable that the speed of the table creation processing be increased to some degree.

A second embodiment of the present invention which is intended to increase the speed of table creation will be described with reference to FIG. 7.

Figure 7:
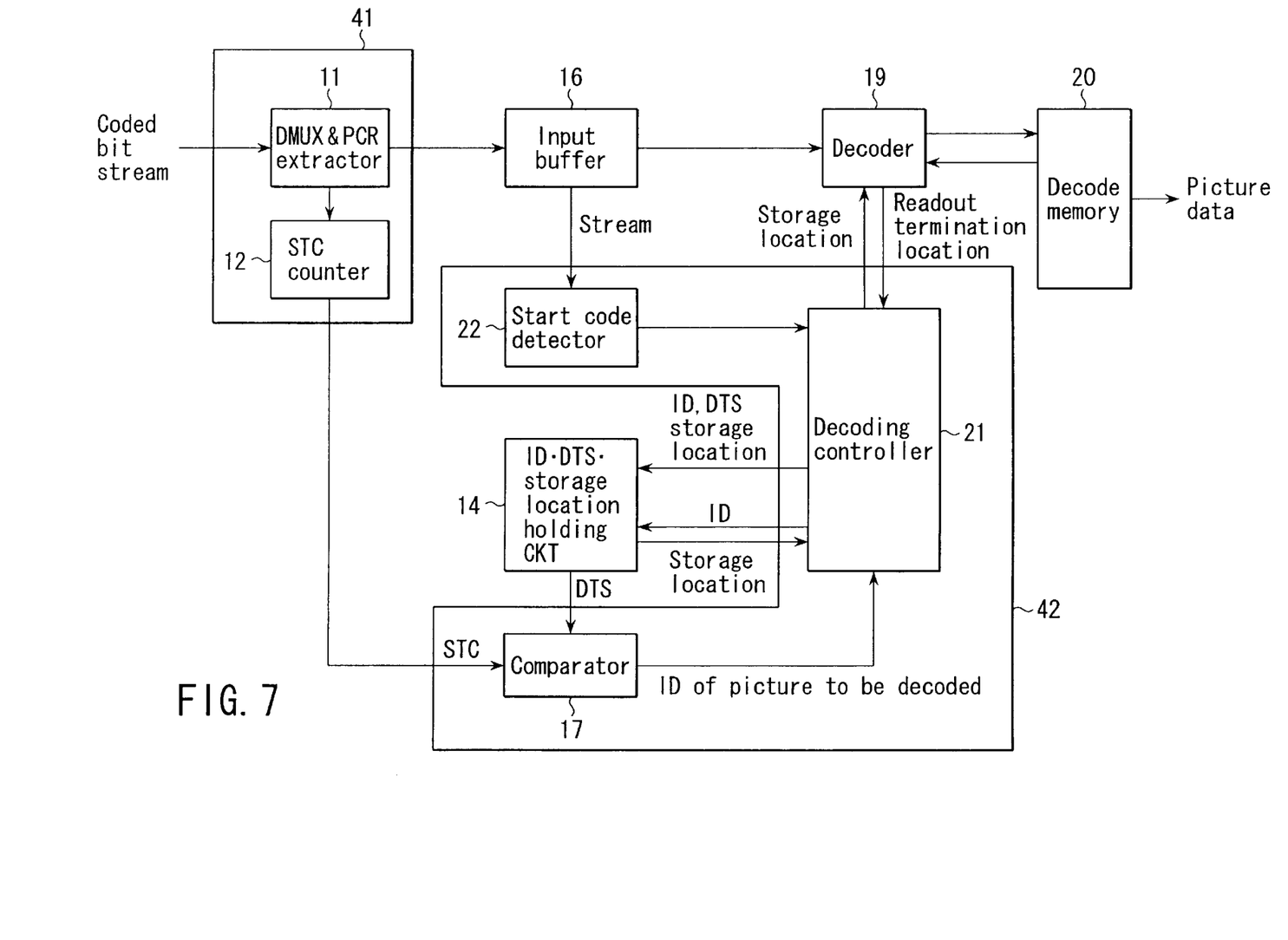
FIG. 7 is a block diagram of a digital television receiver according to a second embodiment of the present invention.

FIG. 7 shows the second embodiment of the invention applied to a digital television receiver as in FIG. 6.

The second embodiment is different from the first embodiment in that the decoding module 33 has a start code detector 22 added. The start code detector 22 is included in the processor 42 in FIG. 5.

The start code detector 22 detects a start code (PES header) at the beginning of each frame in the coded bit stream with DTSs written into the input buffer 16. Each start code is followed by a DTS and PT. It is unnecessary to scan the remaining portion of each frame data in order to detect the presence or absence of the start code. Thus, the provision of the start bit detector 22 to detect each start code allows the decoding controller 21 to detect the immediately following DTS and PT quickly.

According to the second embodiment, therefore, not only is the same advantage as in the first embodiment provided, but the speed of table creation processing can be increased.

In the second embodiment as well, with multi-channel image data, a table is created for each channel. In this case, the decoding controller 21 allows the decoder 19 to process different channels on a time-sharing basis through the use of readout termination location information from it. Each frame data decoded is sent through the memory I/F 45 in FIG. 5 to the display picture processor 46, which performs such a process as adds another picture to a selected area of a picture. The output of the display screen processing circuit 44 is sent to the NTSC encoder 47 where picture data is converted into a video signal in a predetermined television format. The resultant video signal is then sent to the display 34 in FIG. 4 so that it is visually displayed.

According to the first and second embodiments, coded picture data having DTSs appended are written into the input buffer, and a portion of the input buffer is scanned to create a table. After that, picture data is decoded according to data in the table and STC. The table is simply created for a required number of frames unlike a table which is created for all frames in writing coded picture data into the input buffer. Thus, the table size can be reduced, allowing the amount of memory area taken up by the table to be reduced. To create a table for all frames in writing into the input buffer, the table needs a size corresponding to a maximum number of frames written into the input buffer. That the table is allowed to be small in size is effective in special picture reproduction, particularly reproduction in reverse direction, which requires the buffer to be large in size.

After picture data have been written into the input buffer 16, a table is created for a portion of the data; therefore, a sufficient time is allowed to create the table. For this reason, dedicated hardware to create the table can be reduced, preventing the circuit scale from increasing.

In the event that the DTS for a certain picture shows a peculiar value, since the DTS has also been written into the input buffer, it is possible to examine whether the DTS value is proper according the context in which that picture appears. Error processing can thus be simplified.

Figure 8:
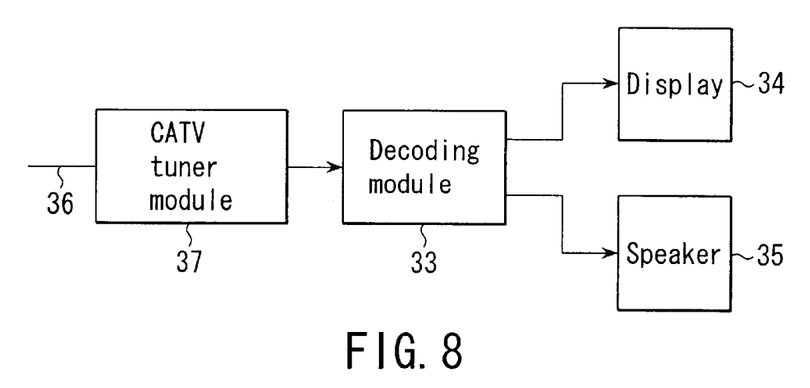
FIG. 8 is a simplified block diagram of a cable television receiver according to a third embodiment of the present invention.

FIG. 8 shows a cable television (CATV) receiver according to a third embodiment of the present invention. In FIG. 8, like reference numerals are used to denote corresponding components to those in FIG. 4 and descriptions thereof are omitted.

An analog-modulated television signal is sent over a cable 36 to a CATV tuner module 37. In the tuner module 37, a desired station is selected and the resultant analog signal is converted into digital form. Finally, a coded bit stream with temporal information, such as an MPEG-2 transport stream, is produced and then applied to the decoding module 33 as in the FIG. 4 case.

The docoding module 33 in FIG. 8 is identical in arrangement to that in FIG. 5. Also, its detailed arrangement is identical to that in FIG. 6 or 7. Therefore, the description thereof is omitted.

The third embodiment can also provide the same advantages as the first and second embodiments.

Figure 9:
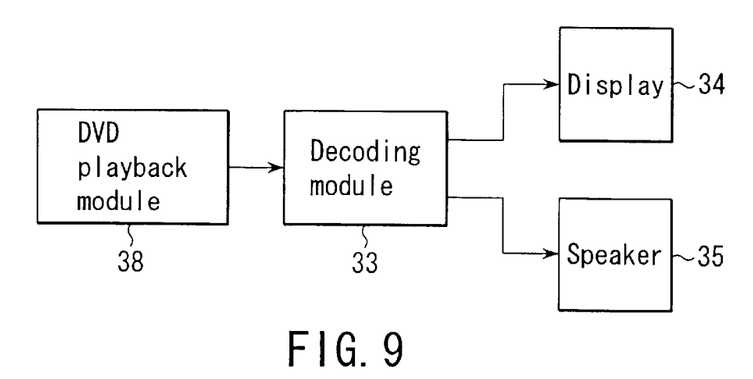
FIG. 9 is a simplified block diagram of a DVD player according to a fourth embodiment of the present invention.

FIG. 9 shows a DVD player according to a fourth embodiment of the present invention. In FIG. 9, like reference numerals are used to denote corresponding components to those in FIG. 4 and descriptions thereof are omitted.

In a DVD playback module 38, an analog signal obtained by playing back a DVD disk is converted into digital form. Finally, a coded bit stream with temporal information, such as an MPEG-2 transport stream, is produced and then applied to the decoding module 33 as in the FIG. 4 case.

The docoding module 33 in FIG. 9 is identical in arrangement to that in FIG. 5. Also, its detailed arrangement is identical to that in FIG. 6 or 7. Therefore, the description thereof is omitted.

The fourth embodiment can also provide the same advantages as the first and second embodiments.

Additional advantages and modifications will readily occur to those skilled in the art. Therefore, the invention in its broader aspects is not limited to the specific details and representative embodiments shown and described herein. Accordingly, various modification may be made without departing from the spirit or scope of the general inventive concept as defined by the appended claims and their equivalents.

What is claimed is:

1. An image processing device comprising:

a reference time information extractor coupled to receive a bit stream containing coded image data and having system reference time information for reproducing the system reference time on an encoder side and decode start time information appended for extracting the system reference time information;

a buffer coupled to receive the bit stream after the system reference time information has been extracted for storing it;

a decoding controller coupled to the buffer for scanning a portion of the bit stream stored in the buffer to produce identification information for each frame of image data and then outputting the identification information together with decode start time information for the corresponding frame of image data, information concerning the storage location of the corresponding frame of image data in the buffer, and information concerning a coding type of the corresponding frame of image data;

a hold circuit coupled to the decoding controller for holding the identification information, the decode start time information, the storage location information, and the coding type information for each frame of image data in the form of a mapping table;

a reference time information revise circuit coupled to the reference time information extractor for producing reference time information on a decoder side and, in the even that there is a displacement between the decoder-side reference time information and the system reference time information, revising the decoder-side reference time information;

a comparator coupled to the reference time information revise circuit and the hold circuit for making a comparison between the decoder-side reference time information and the decode start time information for each frame in the hold circuit and, when a match occurs, outputting the identification information for image data to be decoded; and a decoder coupled to the buffer and the decoding controller for reading that image data to be decoded from the buffer and decoding it, wherein the decoding controller reads from the hold circuit the storage location information for the image data corresponding to the identification information output from the comparator and sends it to the decoder as an address used in reading the image data from the buffer.

2. The image processing device according to claim 1, wherein, the decoding controller reads the bit stream stored in the buffer in a nondestructive manner.

3. The image processing device according to claim 1, further comprising a detector coupled to the buffer and the decoding controller for scanning the bit stream stored in the buffer to detect a header start code for each frame of image data and outputting it to the decoding controller, the decoding controller identifying the reference time information and the decode start time information on the basis of the header start code.

4. A digital television receiver comprising:
   a tuner module coupled to an antenna which receives an analog-modulated digital television broadcast signal, for selecting the broadcast signal and outputting a bit stream containing at least coded image data and having system reference time information for reproducing the system reference time on an encoder side and decode start time information appended; and
   a decoding module coupled to the tuner module for decoding at least image data from the bit stream and outputting a video signal,
   the decoding module including:
      a reference time information extractor coupled to receive the bit stream for extracting the system reference time information;
      a buffer coupled to receive the bit stream after the system reference time information has been extracted for storing it;
      a decoding controller coupled to the buffer for scanning a portion of the bit stream stored in the buffer to produce identification information for each frame of image data and then outputting the identification information together with decode start time information for the corresponding frame of image data, information concerning the storage location of the corresponding frame of image data in the buffer, and information concerning a coding type of the corresponding frame of image data;
      a hold circuit coupled to the decoding controller for holding the identification information, the decode start time information, the storage location information, and the coding type information for each frame of image data in the form of a mapping table;
      a reference time information revise circuit coupled to the reference time information extractor for producing reference time information on a decoder side and, in the even that there is a displacement between the decoder-side reference time information and the system reference time information, revising the decoder-side reference time information;
      a comparator coupled to the reference time information revise circuit and the hold circuit for making a comparison between the decoder-side reference time information and the decode start time information for each frame in the hold circuit and, when a match occurs, outputting the identification information for image data to be decoded; and
      a decoder coupled to the buffer and the decoding controller for reading that image data to be decoded from the buffer and decoding it,
      wherein the decoding controller reads from the hold circuit the storage location information for the image data corresponding to the identification information output from the comparator and sends it to the decoder as an address used in reading the image data from the buffer.

5. The television receiver according to claim 4, wherein, the decoding controller reads the bit stream stored in the buffer in a nondestructive manner.

6. The television receiver according to claim 4, further comprising a detector coupled to the buffer and the decoding controller for scanning the bit stream stored in the buffer to detect a header start code for each frame of image data and outputting it to the decoding controller, the decoding controller identifying the reference time information and the decode start time information on the basis of the header start code.

7. A cable television receiver comprising:
   a tuner module coupled to a cable which receives an analog-modulated digital television signal is transmitted, for selecting the television signal and outputting a bit stream containing at least coded image data and having system reference time information for reproducing the system reference time on the encoder side and decode start time information appended; and
   a decoding module coupled to the tuner module for decoding at least image data from the bit stream and outputting a video signal,
   the decoding module including:
      a reference time information extractor coupled to receive the bit stream for extracting the system reference time information;
      a buffer coupled to receive the bit stream after the system reference time information has been extracted for storing it;
      a decoding controller coupled to the buffer for scanning a portion of the bit stream stored in the buffer to produce identification information for each frame of image data and then outputting the identification information together with decode start time information for the corresponding frame of image data, information concerning the storage location of the corresponding frame of image data in the buffer, and information concerning a coding type of the corresponding frame of image data;
      a hold circuit coupled to the decoding controller for holding the identification information, the decode start time information, the storage location information, and the coding type information for each frame of image data in the form of a mapping table;
      a reference time information revise circuit coupled to the reference time information extractor for producing reference time information on the decoder side and, in the even that there is a displacement between the decoder-side reference time information and the system reference time information, revising the decoder-side reference time information;
      a comparator coupled to the reference time information revise circuit and the hold circuit for making a comparison between the decoder-side reference time information and the decode start time information for each frame in the hold circuit and, when a match occurs, outputting the identification information for image data to be decoded; and
      a decoder coupled to the buffer and the decoding controller for reading that image data to be decoded from the buffer and decoding it,
      wherein the decoding controller reads from the hold circuit the storage location information for the image data corresponding to the identification information output from the comparator and sends it to the decoder as an address used in reading the image data from the buffer.

8. The cable television receiver according to claim 7, wherein, the decoding controller reads the bit stream stored in the buffer in a nondestructive manner.

9. The cable television receiver according to claim 7, further comprising a detector coupled to the buffer and the decoding controller for scanning the bit stream stored in the buffer to detect a header start code for each frame of image data and outputting it to the decoding controller, the decoding controller identifying the reference time information and the decode start time information on the basis of the header start code.

10. An image reproducing device comprising:
a reproducing module for reproducing a bit stream recorded on a recording medium which contains at least coded image data and has system reference time information for reproducing the system reference time on an encoder side and decode start time information appended; and
a decoding module coupled to the reproducing module for decoding at least image data from the bit stream and outputting a video signal,
the decoding module including:
a reference time information extractor coupled to receive the bit stream for extracting the system reference time information;
a buffer coupled to receive the bit stream after the system reference time information has been extracted for storing it;
a decoding controller coupled to the buffer for scanning a portion of the bit stream stored in the buffer to produce identification information for each frame of image data and then outputting the identification information together with decode start time information for the corresponding frame of image data, information concerning the storage location of the corresponding frame of image data in the buffer, and information concerning a coding type of the corresponding frame of image data;
a hold circuit coupled to the decoding controller for holding the identification information, the decode start time information, the storage location information, and the coding type information for each frame of image data in the form of a mapping table;
a reference time information revise circuit coupled to the reference time information extractor for producing reference time information on a decoder side and, in the even that there is a displacement between the decoder-side reference time information and the system reference time information, revising the decoder-side reference time information;
a comparator coupled to the reference time information revise circuit and the hold circuit for making a comparison between the decoder-side reference time information and the decode start time information for each frame in the hold circuit and, when a match occurs, outputting the identification information for image data to be decoded; and
a decoder coupled to the buffer and the decoding controller for reading that image data to be decoded from the buffer and decoding it,
wherein the decoding controller reads from the hold circuit the storage location information for the image data corresponding to the identification information output from the comparator and sends it to the decoder as an address used in reading the image data from the buffer.

11. The image reproducing device according to claim 10, wherein, the decoding controller reads the bit stream stored in the buffer in a nondestructive manner.

12. The image reproducing device according to claim 11, further comprising a detector coupled to the buffer and the decoding controller for scanning the bit stream stored in the buffer to detect a header start code for each frame of image data and outputting it to the decoding controller, the decoding controller identifying the reference time information and the decode start time information on the basis of the header start code.

13. An image processing method comprising:
receiving a bit stream containing coded image data and having system reference time information for reproducing the system reference time on an encoder side and decode start time information appended and extracting the system reference time information from the bit stream;
producing reference time information on a decoder side and, in the even that there is a displacement between the decoder-side reference time information and the system reference time information, revising the decoder-side reference time information;
storing the bit stream after the system reference time information has been extracted into a buffer;
scanning a portion of the bit stream stored in the buffer to produce identification information for each frame of image data and then holding, in the form of a mapping table, the identification information, decode start time information for the corresponding frame of image data, information concerning the storage location of the corresponding frame of image data in the buffer, and information concerning a coding type of the corresponding frame of image data;
making a comparison between the decoder-side reference time information and the decode start time information for each frame in the table and, when a match occurs, outputting the identification information for image data to be decoded; and
reading the storage location information for the image data corresponding to the identification information from the table and sending it to the decoder as an address used in reading and decoding the image data from the buffer.

14. The image processing method according to claim 3, further comprising scanning the bit stream stored in the buffer to detect a header start code for each frame of image data and identifying the reference time information and the decode start time information on the basis of the header start code.

15. The image processing method according to claim 13, wherein, in scanning the bit stream stored in the buffer, the bit stream is read out of the buffer in a nondestructive manner.

* * * * *